United States Patent [19]
Fischer et al.

[11] Patent Number: 5,199,538
[45] Date of Patent: Apr. 6, 1993

[54] DRIVE DEVICE WITH VARIABLE TORQUE-LIMITING SYSTEM

[75] Inventors: Manfred Fischer, Markdorf; Alfred Magg, Friedrichshafen, both of Fed. Rep. of Germany

[73] Assignee: Zahnradfabrik Friedrichshafen AG, Fed. Rep. of Germany

[21] Appl. No.: 752,472

[22] PCT Filed: Feb. 20, 1990

[86] PCT No.: PCT/EP90/00273

§ 371 Date: Aug. 22, 1991

§ 102(e) Date: Aug. 22, 1991

[87] PCT Pub. No.: WO90/09921

PCT Pub. Date: Sep. 7, 1990

[30] Foreign Application Priority Data

Feb. 23, 1989 [DE] Fed. Rep. of Germany ....... 3905576

[51] Int. Cl.⁵ .................. B60K 41/26; F16D 55/14
[52] U.S. Cl. ........................... 192/7; 188/134
[58] Field of Search .............. 192/7, 139; 188/134

[56] References Cited

U.S. PATENT DOCUMENTS 4,030,578 6/1977 Cacciola .
4,176,733 12/1979 Twickler ................... 188/134
4,751,988 6/1988 Metcalf ...................... 192/7
4,923,039 5/1990 Russ ........................... 192/7

FOREIGN PATENT DOCUMENTS 2424445 11/1979 France .

Primary Examiner—Rodney H. Bonck
Attorney, Agent, or Firm—Davis, Bujold & Streck

[57] ABSTRACT

A drive device with variable torque-limiting system. When a setting mechanism (17) forming part of a crank mechanism (23) is actuated in order to displace a carrier waggon (19) to which a hydrofoil component (2) is fastened, large forces are induced. To avoid excessive stresses on the components, the torque-limiter (15) is designed so that the drive torque is automatically variable within the limits of an adjustment range (88). The drive torque to be limited can, for example, be set at low values at the beginning and at the end of an oscillation path of the setting mechanism (17). The drive torque is varied by varying the preloading force of the spring assembly (47) of the torque-limiter (15). To this end, a comparator (74) detects the number of rotations of the output shaft (38) and varies the preloading force of the spring assembly (47).

22 Claims, 5 Drawing Sheets

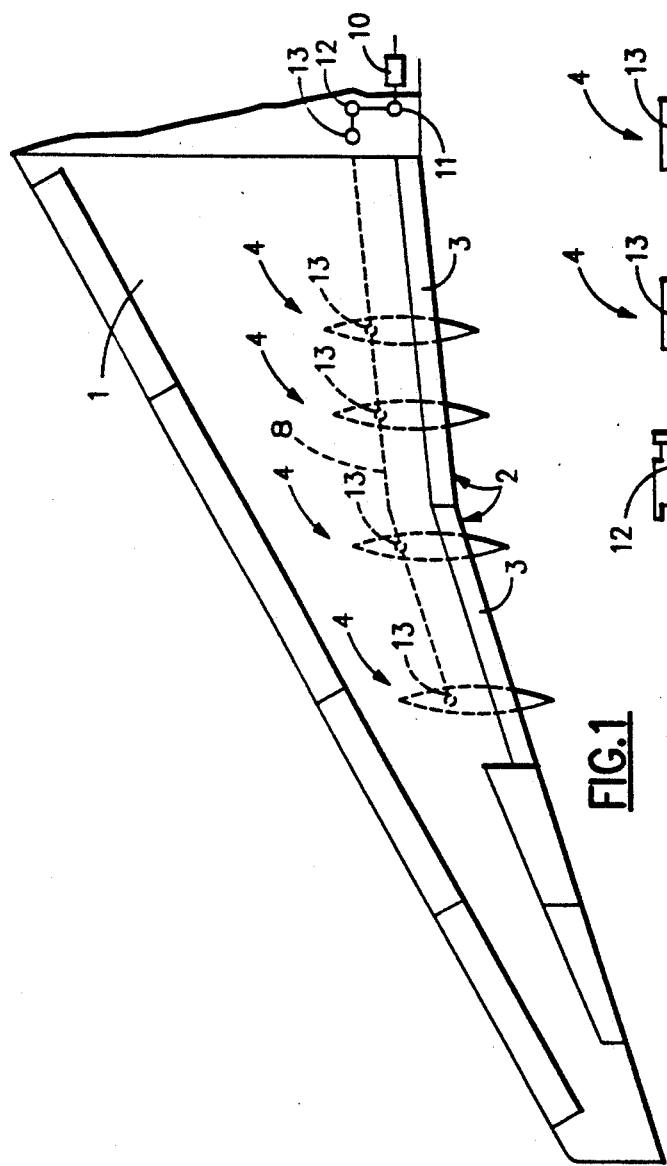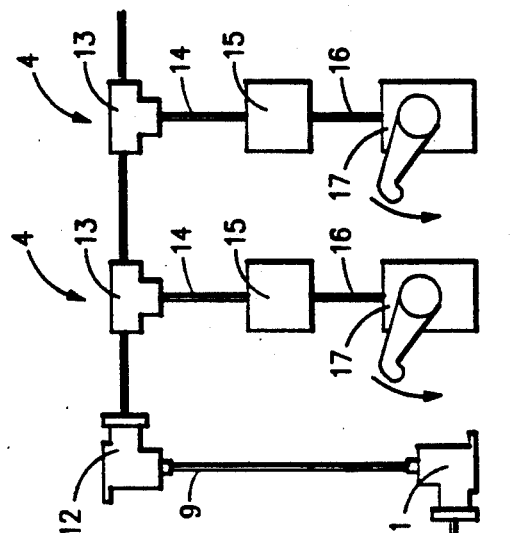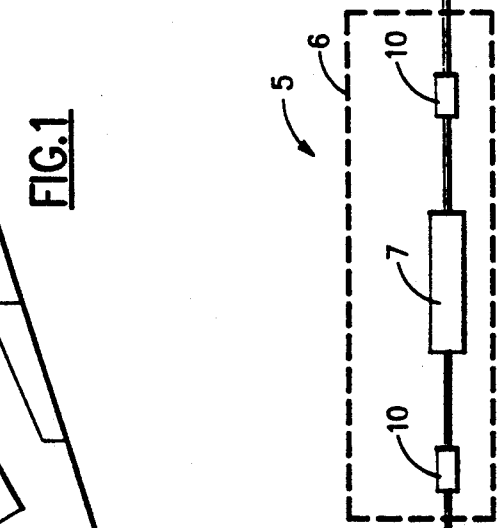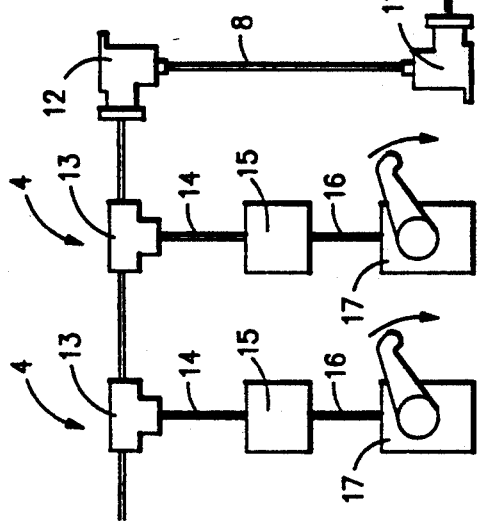
FIG.1
FIG.2

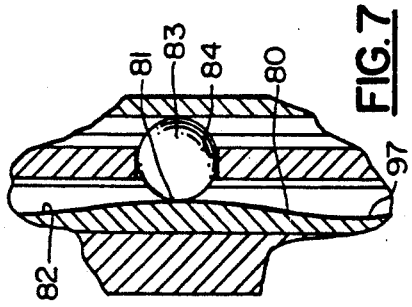
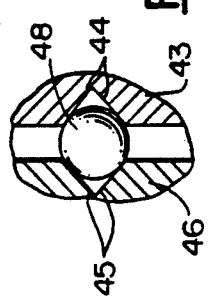
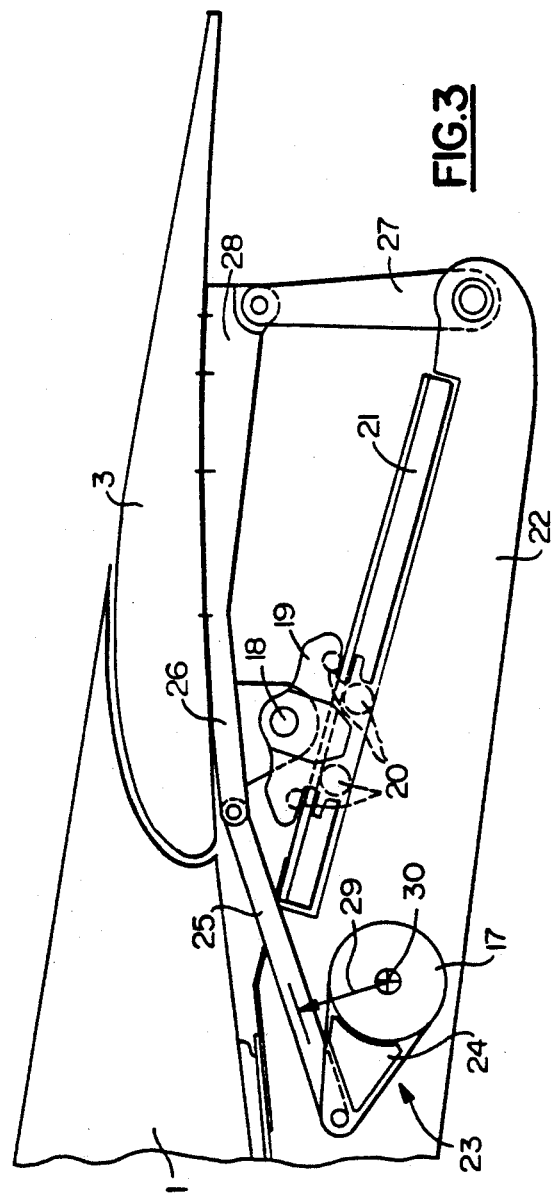
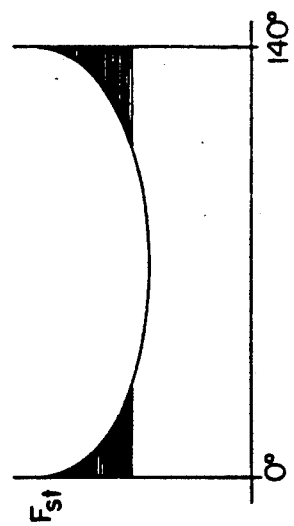

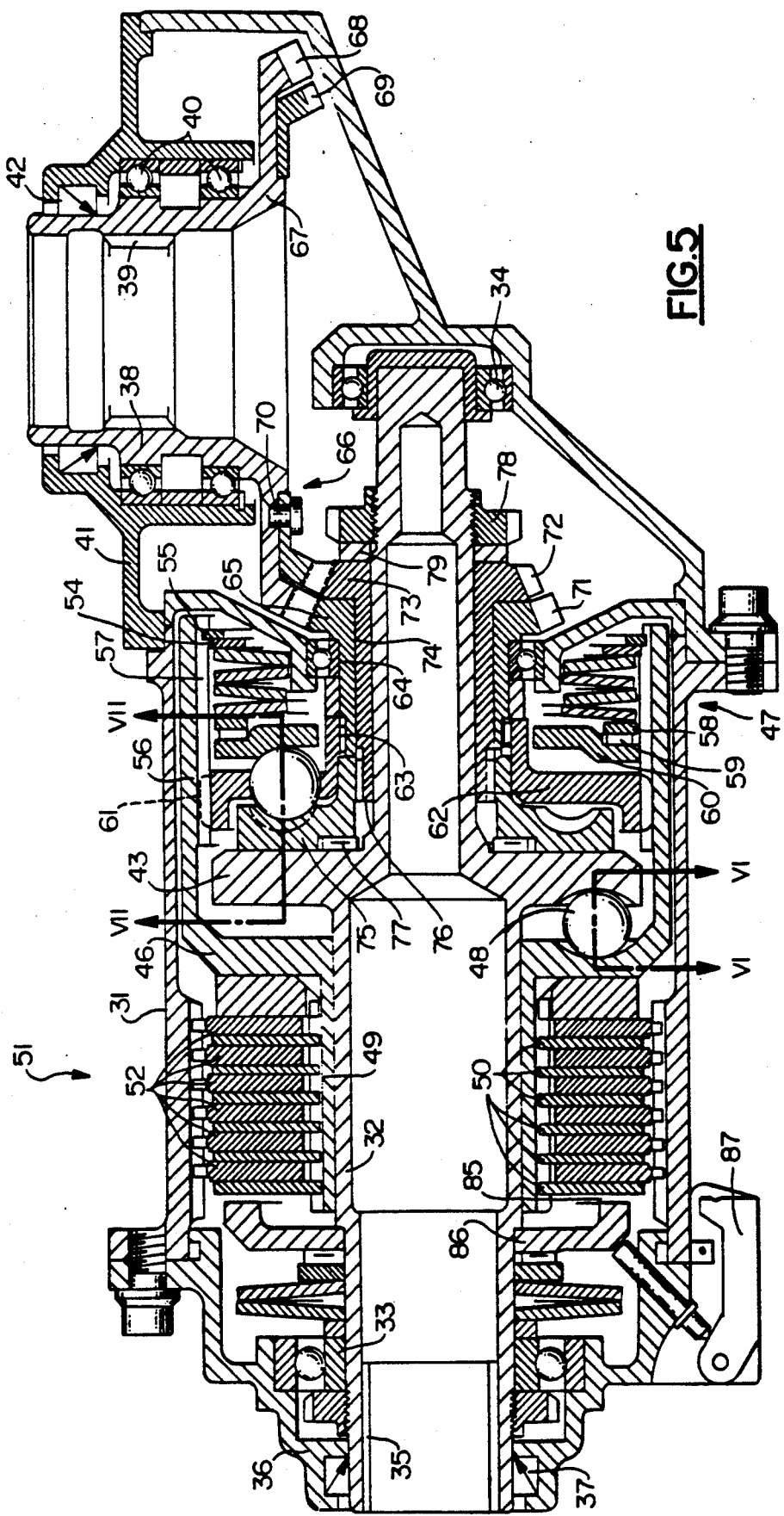

DRIVE DEVICE WITH VARIABLE TORQUE-LIMITING SYSTEM

The invention concerns a drive device for a setting mechanism having an input shaft for introducing an input torque and an output shaft for delivering an output torque and a torque limiter with which the output torque can be limited. Such drive devices for setting mechanisms are specially used in aircrafts having hydrofoil components that are driven in and out for changing the aerodynamic conditions. What are concerned here are mainly landing flaps (Fowler flaps), slats and other hydrofoil flaps (such as fenders).

In a drive device known already (DE-T1-35 90 370, publication of the international application having Publication No.: WO 86/00968) the setting mechanism consists of a multi-step transmission having a series of planetary differentials. Steps for limiting a maximum output torque are not claimed in the setting mechanism already known.

In DE-OS 36 20 886, a drive device for a setting mechanism for relocating a carrier wagon of a hydrofoil component is shown and described. In said drive device, the load for moving the carrier wagon is transmitted via two load paths starting from a central drive unit and a first differential transmission. For said purpose the first differential transmission drives two output shafts which, via another differential transmission, actuate two crank drives of a carrier wagon. The number of revolutions of the drive shaft and of an output shaft are constantly compared with each other. For this purpose, a so-called delta-alpha brake is used, which stalls the input or output shaft when a difference of angle occurs. Thereby the carrier wagon and therewith the landing flap are locked in their positions. Thus said arrangement has the advantage in that when a maximum admissible output power is exceeded, for instance, in the case of ice formation, the drive of the carrier wagon is interrupted. Breakage of an element in the load path does not occur since the other load path is capable of carrying the mechanical and aerodynamic loads.

The drive devices or setting mechanisms already known have a series of disadvantages. A torque limitation is not claimed in the DE-T1-35 90 370 publication while the object according to DE-OS 36 20 886 did take said circumstance into consideration. But a poor efficiency is common to both arrangements. Considering that the total efficiency results achieved by multiplying the individual efficiency—(which is not good anyway) —of planetary differentials or differential transmissions are completely unsatisfactory, drive devices or setting mechanisms of that kind are suitable for practical use, but only with limitations.

There has also been disclosed an angle transmission having a device for limiting a maximally admissible output torque to be used in drive devices for setting mechanisms to drive hydrofoil components of an aircraft in and out. Such angle transmissions, also known as torque limiters, are essentially composed of an input shaft, an output shaft, a multi-disc brake and an end drive, for instance, in the form of a bevel-gear angle drive. The input and output shafts are held in place by spreading elements such as balls, under the action of a preloading force produced by a spring assembly. The circumferential force needed for transmitting a torque is distributed on the spreading elements so that a spreading force results which counteracts the preloading force of the spring assembly and acts proportionally to the transmissible torque. If the spreading force exceeds the preloading force, the input and output ramps begin to spread. After neutralizing an existing play in order to allow the discs of the multi-disc brake to rotate when the multi-disc brake is open without an opposing influence, the discs are compressed. By closing of the multi-disc brake, a brake torque is produced so that the output torque can be limited to a specific value. A drive device for a setting mechanism having such a torque limiter has—together with an effective limitation of the output torque—the advantage of a good efficiency. Additionally, in the case of blockage, such as when ice formation occurs, the drive can be reversed and re-actuated. Together with said advantages it has proved disadvantageous, when using a setting mechanism which is specially designed as a crank mechanism, that the stress, from the point of view of force of individual component parts, is especially high. This high stress particularly appears in the end positions of the setting mechanism.

On the basis of a drive device for a setting mechanism making use of a torque limiter, the problem to be solved by the invention is to design a torque limiter such that together with its main function of limiting a maximally admissible output torque, it can be additionally capable of protecting against overstressing component parts of the setting mechanism that are highly stressed from the point of view of force.

The stated problem is solved according to the invention by the fact that transmissible output torque ($T_{ab}$) can be automatically variably limited in the limits of an adjusting range depending on the number of revolutions of the input and output shafts. Based on the knowledge that individual parts are highly stressed despite the use of a torque limiter within the setting mechanism, the solution proposed gives the expert the decisive indication of automatically varying the transmissible output torque of the torque limiter so that the stresses due to force prevailing at the moment can be taken into consideration. In particular, high stresses of individual parts of the setting mechanism can be prevented in the end positions thereof. In this connection, it is specially advantageous to limit the transmissible output torque ($T_{ab}$) at the beginning and at the end of a number of revolutions of the input and output shafts to substantially an equal or lower value—compared with the values of the intermediate range of the number of revolutions of the input and output shafts.

A specially simple solution for automatic change of the transmissible output torque consists in that the preloading force is automatically changed depending on the number of revolutions of the input and output shafts. In this connection, it is advantageous to determine the number of revolutions of the output shaft by means of a comparator.

A specially compact and constructionally simple solution, in a drive device having a torque limiter with the features according to the invention, results from the fact that the spring assembly is supported on the output flange and on the comparator, the preloading force being changeable by consciously producing a relative rotation between the comparator and the output flange or the coupling element. By using said step, it is readily possible to coordinate with a specific swinging path of the setting mechanism a specific relative rotation of the comparator so that the transmissible output torque can be exactly adapted to the existing load conditions.

It is of the essence that the comparator be axially immovable in relation to the input shaft, the output flange or the coupling member and the input flange, but be situated rotatably and torsionally driveably—preferably starting from the output bevel gear.

To change the preloading force of the spring assembly, a comparator can be used having an annular shoulder which has a control path. By supporting the spring assembly on the comparator, which can be effected over balls without any significant frictional loss, it is possible to change the preloading force in a constructionally specially simple design.

To support the spring assembly on the balls, a supporting ring which via rollers can abut against an end shim of the spring assembly in order to minimize the friction is convenient.

According to another essential feature of the invention, the output bevel gear has gear rings. This feature allows the input bevel gear to mesh with a first gear ring of the output bevel gear so as to form a first drive. One gear of the comparator is in driven connection with another gear ring of the output bevel gear so that a second drive is formed. A solution including the proposed features stands out by a surprisingly simple design. With few parts and specially simply designed drive connections it is possible to create the conditions for a specially simple possibility of changing the preloading force of the spring assembly.

The ratios of the drives are laid out in a manner such that the ratio of the first drive differs slightly from the ratio of the second drive. It is thus possible, for instance, with a given number of revolutions of the output bevel gear to select the number of revolutions of the input bevel gear (which are slightly higher or lower than the number of revolutions of the gear of the comparator) in order to produce the relative rotation of the comparator.

In a preferred embodiment of the invention, there is a relative rotation of substantially 120° between the comparator and the output flange after reaching a given number of revolutions of the output bevel gear. Analogous to said relative rotation, there are three balls on the control path and the wavelike control path has protrusions and depressions staggered by 120° each.

A specially simple design and mounting of the comparator is another object of the invention.

If the input bevel gear of the end drive is driven by a coupling element via an engaging gearing, it is advantageous for the reciprocal mounting of the individual parts to situate the engaging gearing forming a hollow shaft at an axial distance from the input bevel gear. Additionally, it is then also easily possible to support the hollow shaft in the region between the engaging gearing and the input bevel gear within a bearing firmly situated in the housing.

According to another advantageous feature, a reliable guidance of the balls is obtainable in that they are passed with slight play into recesses of the coupling element.

In another embodiment of the object of the invention which is based on an arrangement in which the discs of the multi-disc brake are situated between the output flange and the spring assembly that produces the preloading force, the side of the spring assembly opposite the discs abuts against a counter support firmly connected with one end of an adjusting element, with the other end of the adjusting element abutting against the balls. In this embodiment, the counter support as well as the opposite end of the adjusting element, have star and radially pointing fingers arranged which penetrate into recesses of the input shaft so that the adjusting element is situated axially movably in relation to the input shaft.

The proposed drive device is specially adequate for driving a carrier wagon of a hydrofoil component along a track of a hydrofoil of an aircraft. By hydrofoil components are to be understood in particular, landing flaps (Fowler flaps), slats, fenders or spoilers, or the like.

More particular details and features of the invention and the advantages resulting therefrom are to be deduced from the description of two embodiments that follows.

In the drawings:

FIG. 1 diagrammatically shows a topview on a hydrofoil of an aircraft;

FIG. 2 shows a drive device for relocating hydrofoil components of the hydrofoil according to FIG. 1;

FIG. 3 parts of the drive device with a setting mechanism for relocating a hydrofoil component in simplified representation seen in side view;

FIG. 4 shows the stress according to force of one part of the setting mechanism according to FIG. 3;

FIG. 5 shows a first embodiment of a torque limiter seen in longitudinal section;

FIG. 6 shows a partial section along line VI—VI in FIG. 5;

FIG. 7 shows a partial section along line VII—VII in FIG. 5;

Figure 9:
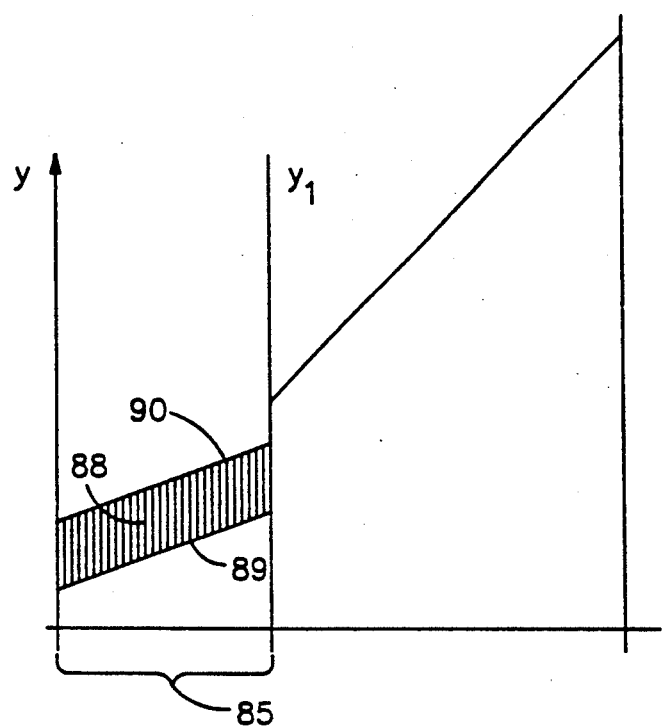

FIG. 9 diagrammatically shows the forces-path ratio in form of a diagram and

Figure 10:
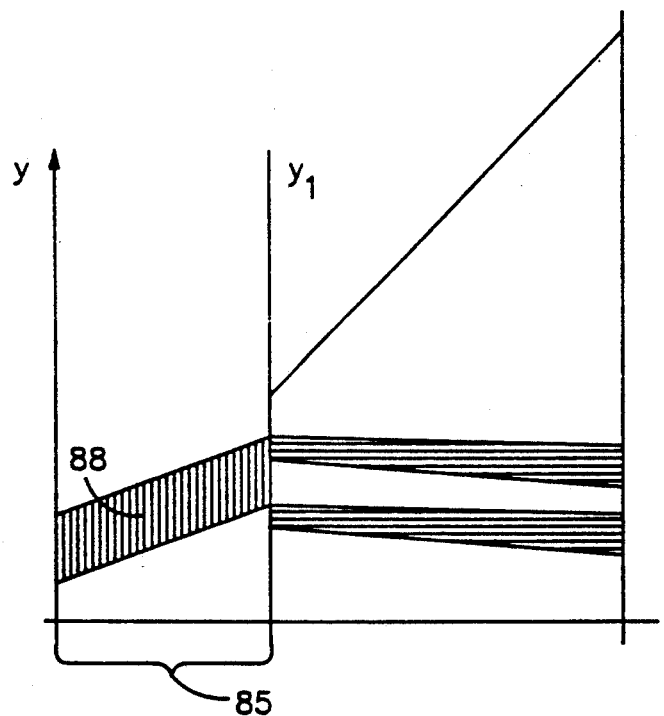

FIG. 10 diagrammatically shows the operative torque over the swinging path of the setting mechanism likewise in form of a diagram.

In FIG. 1, shown diagrammatically, the outlines of a hydrofoil 1 of an aircraft (not shown) are to be seen.

The hydrofoil depicted is the left hydrofoil. The hydrofoil 1 has at its disposal several hydrofoil components 2 which can be driven in and out for changing the aerodynamic profile of the hydrofoil 1. The hydrofoil components 2 can be, for instance, slats, landing flaps, spoilers or fenders. Fowler flaps 3 are actuated in the embodiment shown. The Fowler flaps 3 are relocated in drive stations 4 with the aid of a drive device 5 whose basic construction is to be deduced from the drawing in FIG. 2.

The central point of the drive device is a central power unit 6 having a transfer transmission 7, from which is driven a central input shaft 8 or 9, respectively, for the left or right hydrofoil 1 of a aircraft. The drive is effected via the torque limiter 10 which limits the maximally admissible output torque for the central input shaft line 8 or 9. The drive power is passed via angle transmissions 11 and 12 to the drive stations 4 of the right and left hydrofoil of the aircraft. Each hydrofoil 1 has at its disposal five drive stations 4 of which two can be seen in the drawings.

The design of a drive station 4 is explained in detail herebelow with reference to FIG. 2 and 3: A T-drive 13 is traversed by the central input shaft line 8 or 9. An output shaft 14 is in operative connection with a torque limiter 15. An output shaft 16 of the torque limiter 15 is in operative connection with a setting mechanism 17.

In FIG. 3 the rear region of the hydrofoil 1 is shown with Fowler flap 3 adhering thereto. Fowler flap 3 is connected via an articulation 18 with a carrier wagon 19 of drive station 4. Carrier wagon 19 is guided via guide elements 20 in a rectilinearly extending track 21 and can be driven along it. Track 21 is a component part of a rack 22 of a crank mechanism 23 which is composed of setting mechanism 17 designed as a swinging drive fixed to the rack, a crank 24 of said setting mechanism 17, a coupling rod 25 which connects the free end of the crank 24 with the front underside 26 of Fowler flap 3 and a rocker 27 which assumes the connection between rear underside 28 of Fowler flap 3 and rack 22.

Fowler flap 3 is relocated as follows:

When central power unit 6 is actuated, the input power is transmitted in equal parts via central input shafts lines 8 and 9 to drive stations 4. Within each drive station 4, the input power is passed via the output shaft 14, torque limiter 15 and output shaft 16 to setting mechanism 17. From the starting positions shown in FIG. 3, which corresponds to the position in the cruise, Fowler flap 3 is moved, that is, driven out, along track 21 by crank mechanism 23 with the aid of carrier wagon 21. Crank 24 of setting mechanism 17 is rotated by about 140° until Fowler flap 3 is completely driven out, that is, it has reached its end position. Output shaft 14, which is operatively connected with an input shaft 32 (FIG. 5) of torque limiter 15, transmits an input torque $T_{an}$, while output shaft 16 introduces an output torque $T_{ab}$ in setting mechanism 17. In case of a blockage, such as can occur with ice formation, torque limiter 15 has the task of limiting the transmissible output torque $T_{ab}$. In this case torque limiter 15 additionally reacts to limit the torque of the central input shaft line 8 or 9.

Subject to the kinematics of crank mechanism 23, relatively high crank-rod forces $F_{st}$ appear in the end positions of swivel drive 17, that is, in the positions in which the distance 29 of crank rod 25 from center 30 of the setting mechanism is at a minimum.

In order to clarify this solution, the schematic diagram according to FIG. 4 shows the fundamental course of the crank-rod forces $F_{st}$ via the swivel path 0° to 140° of setting mechanism 17 or of the crank 24 of setting mechanism 17. It is to be seen that the crank-rod forces $F_{st}$ reach maximum values in the range of the 0° position and in the range of the 140° position. The ranges that stand out by the crank-rod forces $F_{st}$, which are of an above average strength, are specially highlighted on the graph by shaded areas.

FIG. 5 shows in longitudinal section a first embodiment of a torque limiter 15. Stated in general terms, torque limiter 15, together with the task of limiting a maximally admissible output torque $T_{ab}$, has to fulfill the additional function of keeping the transmissible output torque $T_{ab}$ variable, within given limits, in accordance with the existing position of setting mechanism 17 or of crank 24 thereof, so that the values at which a limitation of the output torque $T_{ab}$ is effected—depending on the position of setting mechanism 17 or of crank 24 thereof—differ from each other. The object of this arrangement is to prevent inadmissibly high forces $F_{st}$ in coupling rod 25 of crank mechanism 23.

The design of torque limiter 15 shown in FIG. 5 is as follows:

An input shaft 32 is rotatably mounted over ball bearings 33 and 34 within a transmission housing 31 which is composed altogether of four parts. In the region of ball bearing 33, input shaft 32 has an internal engaging gearing 35 which is positively connected with an engaging gearing, not shown itself, of output shaft 16.

Ball bearing 33 is centered in a cover 36. A seal ring 37 assumes the sealing between cover 36 and input shaft 32.

An input torque $T_{an}$ is introduced in the torque limiter 15 via input shaft 32. An output torque $T_{ab}$ is delivered via an output shaft 38 which is designed as a hollow shaft.

Output shaft 38 has an internal engaging gearing 39, which is in positive operative connection (not shown in FIG. 5) with an engaging gearing of output shaft 16 for operating setting mechanism 17. Output shaft 38 is rotatably supported over a pair of ball bearings 40 within another cover 41 of transmission housing 31. Another seal ring 42 is operative between the cover 41 and the output shaft 38.

Input shaft 32 has an input flange 43 located substantially in the middle—in relation to its longitudinal extension. Altogether, three input ramps 44 are provided in said input flange 43. Opposite the input ramps there are three output ramps 45 worked into an output flange 46.

The oppositely oriented input and output ramps 44 and 45 abut on a total of three rollers such as balls 48 under the action of a preloading force produced by a spring assembly 47.

The output flange 46 is designed as carrier 49 for internal discs 50 of a multi-disc brake 51. External discs 52 resting inside the transmission housing 31 complete the multi-disc brake 51.

The spring assembly 47 rests by its end (which in the drawing appears to the right) against an (first) end shim 54. End shim 54 is secured in place with the aid of a guard ring 55 in a sleeve-like extension of the output flange 46. This sleeve-like extension forms with the output flange 46, a cup-like shaped part, which overlaps input flange 43. It also has an internal engaging gearing 57 at its disposal.

The end of the spring assembly 47, appearing to the left in the drawing, likewise abuts on an (second) end shim 58. The end shim 58 abuts via rollers 59 on a supporting ring 60. The rollers 59 ensure a substantially frictionless relative rotation of the supporting ring 60 with respect to end shim 58.

An external engaging gearing 61 of a coupling element 62 positively grips in internal engaging gearing 57 of sleeve-like extension 56 of the output flange 46. The coupling element 62 is in operative connection via another engaging gearing 63 with a hollow shaft 64. The hollow shaft 64 converts on its end (appearing to the right in the drawing) into an input bevel gear 65 of an end drive 66, designed as an angle transmission, of the torque limiter 15. An output bevel gear 67 of the end drive 66 is in torsion-proof connection with the output shaft 38 of the torque limiter 15. In the embodiment described said elements are combined to form a single part.

The output bevel gear has gear rings 68 and 69. The gear rings 68 and 69 are, for instance, connected with each other via screw or riveting connections 70 so as to be torsion-proof. In the embodiment described the gear ring 68 has 74 teeth, the gear ring 69 has 79 teeth.

The first drive 71 is formed by the mating engagement of the input bevel gear 65 with the first gear ring 68 of the output bevel gear 67. The ratio of the first drive 71 is calculated as $29:74 = i_1 = 0.39189$.

A second drive 72 is formed by the mating operative connection of the second gear ring 69 with a gear 73 of a comparator 74. The gear 73 has 31 teeth so that the ratio of the second drive 72 amounts to 31:79=$i_2$=0.39240.

Comparing the ratios $i_1$ and $i_2$ it can be established that the ratio of the first drive 71 differs slightly from the ratio of the second drive 72. In the embodiment shown the ratios $i_1$ and $i_2$ are so tuned to each other that at a given number of revolutions of the output bevel gear 38 the number of revolutions of the input bevel gear 65 is slightly higher than the number of revolutions of the gear 73 of the comparator 74. In the concrete case the difference amounts to 0.29 revolutions. For the remainder, the following applies: the number of revolutions of the output shaft 38 of the torque limiter 15 amounts to 86 revolutions to carry over the crank 24 of the setting mechanism 17 from its initial position (FIG. 3, 0° position according to FIG. 4) to its end position (140° according to FIG. 4).

By means of the slightly differing ratios $i_1$ and $i_2$ of the first drive 71 of the second drive 72, a relative rotation of the comparator 74 is produced (0.29) revolutions) which is transmitted to an annular shoulder 75. This takes place via an engaging gearing 76. Moreover, the comparator 74 is designed as a hollow shaft.

Shoulder 75 is supported via an axial bearing 77 on the side of the input flange 43 remote from the output flange 46, as can be easily seen in the drawing.

The comparator 74, designed as a hollow shaft, is freely rotatably supported with slight axial play on the input shaft 32 of the torque limiter 15 via a security nut 78 and an adjusting ring 79. In the same manner, the hollow shaft 64 with the input bevel gear 65 is supported on the comparator 74 with slight axial play, but is freely rotatably.

Shoulder 75 is provided with a control path 80 which extends in a wavelike manner and consequently has protrusions 81 and depressions 82. There are three protrusions 81 and three depressions 82 which are accordingly offset 120° in respect to each other. Balls 83 abut on the control path 80. The number of balls 83 is in accordance with the configuration of the control path 80; in this embodiment, three balls 83 are used. The balls 83 are conveniently passed with slight play into bores 84 of coupling element 62. The spring assembly 47 is supported on the comparator—specifically on its shoulder 75 via the balls 83 abutting on the control path 80.

From what has been said above it becomes clear that the preloading force of the spring assembly 47, which insures that output flange 46 is loaded in the direction toward input flange 43, is variable. The change of the preloading force is possible with the aid of comparator 74, the shoulder 75 thereof, control path 80 and balls 83. At a certain number of revolutions of input bevel gear 65 of the end drive 66, the output bevel gear 67—and therewith the output shaft 38—effects a specific number of revolutions. To said specific number of revolutions of the output shaft 38 corresponds a relative rotation of the comparator 74 which is produced by the second drive 72. In the instant case, shoulder 75 of comparator 74 effects a relative rotation of 120° calculated on the specific number of revolutions of the output shaft 38, which 86 revolutions.

If drive stations 4 are now operated, the balls 83 are in the depressions 82 of control path 80. The preloading force of the spring assembly 47 is then at its smallest value. With the increasing number of revolutions of output shaft 38 and therewith the increasing oscillation of the crank 24 of setting mechanism 17, the value of the preloading force of spring assembly 47 increasingly rises. This is because the balls 83 are passed in a direction toward the protrusions 81 of the control path 80 due to the relative rotation of the comparator 74. The balls 83 are then moved to the right—per the representation shown in FIG. 5—so that the preloading force is increased—due to the relocation (to the right) of the supporting ring 60. Moreover, the increase of the preloading force can be affected differently by the geometric shape of the control path 80. In the instant case, control path 80 extends substantially in a sinuous-wave-like manner. Other geometric shapes are possible, however, as needed.

In the solution described, the preloading force of spring assembly 47 reaches a maximum when approximately half of the given number of revolutions of output shaft 38 are reached. This corresponds to one half of the pivoting angle available to the crank 24 of setting mechanism 17 in the path from one to the other end position (0° position or 140° position and vice versa).

When output shaft 18 completes additional revolutions, the preloading force of spring assembly 47 again diminishes to reach its lowest value, at which the balls 83 are once more in the depressions 82 of the control path 80.

The mode of operation of the torque limiter 15 is as follows:

The torque limiter 15 is driven via input shaft 32 and input flange 43. Output flange 46 is spring-loaded, pressed against input flange 43. The support is effected via balls 48 on input and output ramps 44 and 45.

The circumferential force needed for transmitting the torque is distributed on the balls 48 so as to produce a spreading force which counteracts the preloading force of spring assembly 47. If the spreading force exceeds the preloading force, the output flange 46 begins to distance itself from the input flange 43. After using a given play 85, the internal and external discs 50 and 52 of the multi-disc brake 51 are compressed by an abutment on a spring-loaded stop 86. As the input torque $T_{an}$ increases, the transmissible output torque $T_{ab}$ on the output shaft 38 of the torque limiter 15 is limited. The excessive input power is reversed by the multi-disc brake 51.

A reaction of the multi-disc brake 51 is made visible by an indicator device 87.

As already can be seen from the foregoing description, it is essential for the operation of the torque limiter 15, that by changing the preloading force of the spring assembly 47 in accordance with the number of revolutions effected by output shaft 38, that the transmissible output torque $T_{ab}$ be made variable within the limits of an adjustment range 88, which is highlighted in FIG. 9 by the shaded surface.

Furthermore, FIG. 9 shows the fundamental course of the spring tensions over the spring pitches. The lower line 89 reproduces the course with low preloading force of the spring assembly 47. It is here that the balls 83 are in the depressions 82 of the control path 80. The upper line 90 reproduces the course of the high preloading force of the spring assembly 47. It applies so that the balls 83 are upon the protrusions 81 of the control path 80. The y-axis corresponds to the starting position, that is, to the position of output flange 46 at maximum (nominal) play 85. The $y_1$ axis marks the beginning of the braking. The y-, $y_1$ axis, line 89 and line 90 mark the limits of the adjustment range 88.

The torque limiter 15 can be operated on any desired working characteristic (which runs parallel with the lines 89 or 90) in the mentioned limits of the adjustment range 88. The transmissible output torque $T_{ab}$ on the output shaft 38 can thus be limited between a lower value (beginning of braking on the line 89) and an upper value (beginning of braking on the line 90). The values at which the multi-disc brake 51 is actuated, in the closing sense, depend on the number of revolutions that the output shaft 38 has covered—from an initial to an end position. In this manner it is possible, effectively, to protect parts of the drive device, especially parts of the crank mechanism 23, against inadmissibly high stresses according to force.

FIG. 10 reproduces the course of the torque and corresponds in analogous manner to the representation in FIG. 9.

Figure 8:
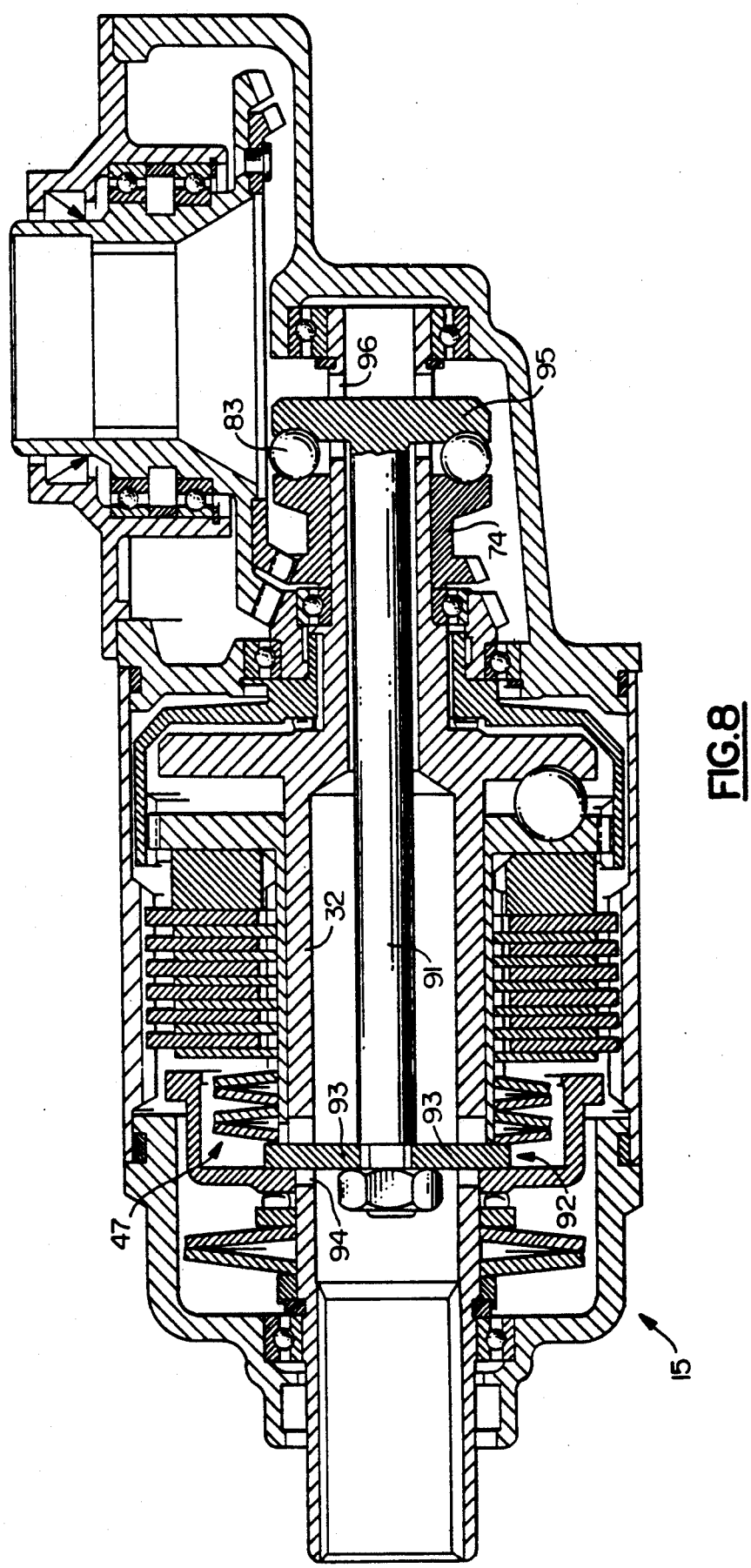
FIG. 8 shows another embodiment of a torque limiter.

In FIG. 8 another embodiment of a torque limiter 15 is reproduced. The comparator 74 is connected here with the spring assembly 47 via a setting element 91 that traverses the input shaft 32. The spring assembly 47 is on a counter support 92 which has a star-like configuration and radially pointing fingers 93 which penetrate recesses 94 of the input shaft 32. In analogous manner, the other end of the setting element 91 penetrates recesses 96 in the input shaft 32 and abuts on the balls 83. The operation of this embodiment of the torque limiter 15 for the remainder corresponds to that of the embodiment according to FIG. 5.

Both embodiments of the torque limiter 15 stand out in that the parts used for changing the preload of the spring assembly 47 revolve essentially at the speed of the input shaft 32 or the output flange 46. Only a (very small) relative rotation takes place for changing the preloading force. Therefore, this will not occur when an obstruction is produced, for instance, by dry operation of the bearings, or when water, condensation or other damaging influences are present. Furthermore, it is of great advantage that no bearings are used which rotate at high speeds and in addition are loaded with great spring tensions which further increase upon reaction of the torque limited. A simple pre-adjustment of the zero point of the torque limiter 15 is possible by the notches 56 in the control path 80. Said pre-adjustment can be simply fixed by adequate means. Said fixation can be made, for instance, by securing the output shaft to the housing by means of binding wire. The binding wire is removed immediately before installation of the torque limiter. The installation proper can be carried out simply, since the reduction ratios allow deviation from the pre-adjustment of the torque limiter for assembly purposes without this being associated with disadvantages for the operation.

REFERENCE NUMERALS 1 hydrofoil
2 hydrofoil component
3 Fowler flap
4 drive station
5 drive device
6 central power unit
7 transfer transmission
8 input shaft line
9 input shaft line
10 torque limiter
11 angle transmission
12 angle transmission
13 T-drive
14 output shaft
15 torque limiter
16 output shaft
17 setting mechanism
18 articulation
19 carrier wagon
20 guide elements
21 track
22 rack
23 crank mechanism
24 crank
25 coupling rod
26 front underside
27 swinger
28 rear underside
29 distance
30 center
31 transmission housing
32 input shaft
33 ball bearing
34 ball bearing
35 gearing
36 housing cover
37 seal ring
38 output shaft
39 engaging gearing
40 ball bearing pair
41 cover
42 seal ring
43 input flange
44 input ramps
45 output ramps
46 output flange
47 spring assembly
48 ball
49 carrier
50 internal discs
51 multi-disc brake
52 external discs
53 hollow shaft
54 end shim
55 guard ring
56 notch
57 engaging gearing
58 end shim
59 roller
60 supporting ring
61 engaging gearing
62 coupling element
63 engaging gearing
64 hollow shaft
65 input bevel gear
66 end drive
67 output bevel gear
68 gear ring
69 gear ring
70 screw connection
71 first drive
72 second drive
73 gear
74 comparator
75 shoulder
76 engaging gearing
77 axial bearing
78 safety nut
79 adjusting ring
80 control path
81 prominence
82 depression
83 ball
84 bore 85 play
86 stop
87 indicator device
88 adjustment range
89 line
90 line
91 setting element
92 counter support
93 finger
94 recesses
95 end
96 recesses

We claim:

1. A drive device having a torque limiter (15) comprising an input shaft (32) and an output shaft (38); an input flange (43) being supported by said input shaft (32) and carrying input ramps (44) on a surface thereof; an output flange (46) drivingly connected with said output shaft (38) and being concentrically located and axially movably with respect to said input shaft (32), said output flange (46) having output ramps (45) on a surface thereof adjacent said input ramps (44), roller members (48) being supported between said input ramps and said output ramps (44, 45) via a pre-load force generated by a spring assembly (47), and a multi-disc brake (51) associated with said output flange for varying transmission of an output torque of said drive device, wherein a comparator element (74) is drivingly connected with said output shaft (38) to detect the number of revolutions of said output shaft (38), said spring assembly (47) interacts with said output flange (46) and said comparator element (74), and the pre-load force of said spring assembly (47) is varied due to relative rotation between said comparator element (74) and said output flange (46) during operation of said drive device.

2. A drive device according to claim 1, wherein said transmissible output torque ($T_{ab}$) of said drive device can be limited at a beginning and at an end of a desired number of revolutions of said input and said output shafts (32, 38) to a value substantially equal to or lower than a generated output torque of an intermediate number of revolutions of said input and said output shafts (32, 38).

3. A drive device according to claim 2, wherein said preload force of said spring assembly (47) is automatically variable relative to the number of revolutions of said input and said output shafts (32, 38).

4. A drive device according to claim 1, wherein said comparator element (74) is located at an axially fixed position but is rotatably drivable in relation to at least one of said input shaft (32), said input flange (43), a coupling member (62) and said output flange (46).

5. A drive device according to claim 4, wherein meshing brake discs (50, 52) of said multi-disc brake (51) are situated between said output flange (46) and said spring assembly (47), and a side of said spring assembly (47) opposite said brake discs (50, 52) abuts against a counter support (92) which is firmly connected with one end of a setting element (91) and an opposite end of said setting element (91) abuts against balls (83) engaging a control path (80).

6. A drive device according to claim 4, wherein an output bevel gear (67), supported by said output shaft (38), is drivingly connected with said comparator (74).

7. A drive device according to claim 4, wherein said comparator (74) includes an annular shoulder (75) having a control path (80) with depressions (82) and protrusions (81) formed on a surface of the annular shoulder (75).

8. A drive device according to claim 7, wherein said protrusions (81) and said depressions (82) are offset respectively by 120° and three balls (83) roll along said control path (80).

9. A drive device according to claim 8, wherein said control path (80) extends in a sinuous wavelike fashion.

10. A drive device according to claim 7, wherein said comparator (74) further comprises a hollow shaft (53) supporting a gear (73), and the annular shoulder (75) and the hollow shaft (53) supporting the gear (73) are separate parts positively connected via an engaging gearing (76).

11. A drive device according to claim 7, wherein the annular shoulder (75) of said comparator (74) is supported via an axial bearing (77) on a side of said input flange (43) remote from said output flange (46).

12. A drive device according to claim 1, wherein said spring assembly (47) is supported by said comparator (74) via balls (83) abutting a control path (80).

13. A drive device according to claim 12, wherein a supporting ring (60) is located between said balls (83) and said spring assembly (47).

14. A drive device according to claim 13, wherein said spring assembly (47) has a second end shim (58), and said supporting ring (60) abuts via rollers (59) against the second end shim (58).

15. A drive device according to claim 12, wherein said control path (80) is provided with a mechanism (56) for pre-adjustment of said torque limiter (15).

16. A drive device according to claim 1, wherein said spring assembly (47) is supported by a sleeve-like extension (56) of said output flange (46) and has a first end shim (54) and a guard ring (55) adjacent one end of the sleeve-like extension (56).

17. A drive device according to claim 1, wherein a first input bevel gear (65) of said comparator (74) is drivingly connected with a first gear ring (68) of said output shaft (38) to form a first drive (71), and a second input bevel gear (73) of said comparator (74) is drivingly connected with a second gear ring (69) of said output shaft (38) to form a second drive (72).

18. A drive device according to claim 17, wherein a ratio ($i_1$) of said first drive (71) differs slightly from a ratio ($i_2$) of said second drive (72).

19. A drive device according to claim 18, wherein upon reaching a given number of revolutions of said first and second gear rings (68, 69) supported by said output shaft (38), a reciprocal relative rotation of about 120° between said comparator (74) and said output flange (46) is provided.

20. A drive device according to claim 1, wherein said comparator (74) comprises a hollow shaft (53) which is freely rotatably supported on said input shaft (32).

21. A drive device according to claim 1, wherein a sleeve-like extension (56) is supported by said output flange (46) and surrounds said input flange (43), said sleeve-like extension (56) has an internal gearing (57) in which an external gearing (61) of a coupling element (62) is positively meshed for securing said coupling element (62) to said sleeve-like extension (56), and said coupling element (62) is positively connected with a hollow shaft (64), supporting a first input bevel gear (65), via another engaging gearing (63).

22. A drive device according to claim 21, wherein said comparator (74) comprises a hollow shaft (53), supporting a second input bevel gear (73), which is freely rotatably supported on said input shaft (32), and a further hollow shaft (64), supporting a first input bevel gear (65), is freely rotatably situated on said hollow shaft (53) of said comparator (74).

* * * * *